(12) United States Patent
Yatsushiro et al.

(10) Patent No.: US 7,500,409 B2
(45) Date of Patent: *Mar. 10, 2009

(54) SEAL FOR BALL SCREW AND BALL SCREW UTILIZING SAME

(75) Inventors: Daisuke Yatsushiro, Yamanashi-ken (JP); Tetsuhiro Nishide, Yamanashi-ken (JP)

(73) Assignee: THK Co., Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 11/129,361

(22) Filed: May 16, 2005

(65) Prior Publication Data

US 2005/0204836 A1    Sep. 22, 2005

Related U.S. Application Data

(63) Continuation of application No. 10/109,845, filed on Apr. 1, 2002, now Pat. No. 6,931,955.

(30) Foreign Application Priority Data

Apr. 5, 2001  (JP) ............................ P2001-106801
Mar. 7, 2002  (JP) ............................ P2002-62602

(51) Int. Cl.
*F16H 25/20* (2006.01)

(52) U.S. Cl. .................... 74/89.4; 74/89.44; 277/354

(58) Field of Classification Search ............... 74/89.4, 74/89.41, 89.44, 424.82; 277/354
See application file for complete search history.

(56) References Cited

U.S. PATENT DOCUMENTS

| | | | |
|---|---|---|---|
| 2,757,548 A * | 8/1956 | Smith et al. ................. | 74/89.41 |
| 2,982,145 A * | 5/1961 | Orner ......................... | 74/89.33 |
| 3,646,827 A | 3/1972 | Patterson | |
| 4,226,431 A | 10/1980 | Jelinek et al. | |
| 4,407,511 A | 10/1983 | Benton et al. | |
| 4,795,172 A * | 1/1989 | Brande ........................ | 277/354 |
| 4,905,533 A | 3/1990 | Benton et al. | |
| 5,029,877 A | 7/1991 | Fedeli | |

(Continued)

FOREIGN PATENT DOCUMENTS

EP    0 071 332 A1    2/1983

(Continued)

*Primary Examiner*—William C Joyce
(74) *Attorney, Agent, or Firm*—Westerman, Hattori, Daniels & Adrian, LLP.

(57) ABSTRACT

A seal for a ball screw is provided with a foreign material removing member having a hole of a shape corresponding to a sectional shape of a ball screw shaft taken perpendicularly to an axis thereof to prevent a foreign material from invading from an outside of a ball screw nut and a seal member having a hole of a shape corresponding to a sectional shape of the ball screw shaft to retain a lubricant existing inside the ball screw nut. The foreign material removing member and the seal member are mounted to the ball screw shaft, at each of both the axial ends of the nut, while being overlapped to each other in a state that inner peripheral portions of the foreign material removing member and the seal member contact an outer peripheral surface of the ball screw shaft and the ball rolling groove thereof. The foreign material removing member is disposed outside the seal member in the axial direction of the ball screw nut.

14 Claims, 9 Drawing Sheets

U.S. PATENT DOCUMENTS

| | | | |
|---|---|---|---|
| 5,178,029 A | 1/1993 | Klinkenberg | |
| 2002/0056333 A1 * | 5/2002 | Ohya et al. | 74/424.81 |

FOREIGN PATENT DOCUMENTS

| | | |
|---|---|---|
| EP | 0 376 164 A2 | 7/1990 |
| GB | 2 218 757 A | 11/1989 |
| GB | 2 223 282 * | 4/1990 |
| JP | 53-47476 | 9/1976 |
| JP | 02-229949 A | 9/1990 |
| JP | 5-43310 Y2 | 11/1993 |
| JP | 06-006795 U | 1/1994 |
| JP | 9-303517 A | 11/1997 |
| JP | 2000-230619 A | 8/2000 |
| JP | 2001-116103 A | 4/2001 |
| JP | 2001-304372 A | 10/2001 |

* cited by examiner

PORTION III IN FIG.1

PORTION X IN FIG. 9

SEAL FOR BALL SCREW AND BALL SCREW UTILIZING SAME

RELATED APPLICATION

This application is a Continuation of U.S. patent application Ser. No. 10/109,845 filed on Apr. 1, 2002, now U.S. Pat. No. 6,931,955 which is hereby incorporated by reference in its entirety.

BACKGROUND OF THE INVENTION

The present invention relates to a seal for a ball screw, which is mounted to both end portions of a ball screw nut to seal inside the nut and also relates to a ball screw provided with such seal.

FIG. 14 shows one example of a seal or seal device of such a ball screw, disclosed for example, in Publication of Japanese Patent Laid-open No. 2000-230619, in which a thin plate of a synthetic resin is formed in shape of ring and the inner peripheral edge thereof is formed to provide a sharp edge. The seal 1 has an inner peripheral edge which contacts an outer peripheral surface or screw groove (threads) of a screw shaft 2 to thereby prevent foreign material or substance such as dust or dirt from invading into a gap between the screw shaft 2 and the ball screw nut 3.

FIG. 15 shows another example of a seal or seal member of such a ball screw, disclosed for example, in Japanese Utility Model Publication No. HEI 5-43310, in which a plurality of thin seal plates 4, formed from the same material, are laminated and inner peripheral edge portions of the laminated thin seal plates 4 contact a screw shaft 7. In this example of the seal for the ball screw, the inner peripheral edge portions of the respective thin plate seals 4 contact an outer peripheral surface or screw groove (threads) of the screw shaft 7 to thereby prevent foreign material such as dust or dirt from invading into a gap between the screw shaft 7 and the ball screw nut 6.

In the structure of the seal for the ball screw in the former example of FIG. 14, it is possible to prevent foreign material such as dust or dirt from invading into a gap between the screw shaft 2 and the ball screw nut 3 from an outside thereof. It is, however, impossible to prevent lubricant adhering to the outer peripheral surface or screw groove of the screw shaft 2 from extruding outward from the inside of the nut 3 through the seal 1. As a result, it is difficult to well retain the lubricant inside the ball screw nut 3.

On the other hand, in the structure of the seal for the ball screw in the latter example of FIG. 15, it is possible to prevent foreign material such as dust or dirt from invading into the ball screw nut from an outside thereof by the laminated seal plates 4. It is, however, also impossible to prevent lubricant adhering to the outer peripheral surface or screw groove of the screw shaft 2 from extruding outward from the inside of the nut 3 through the seal 1. As a result, in both examples, it is difficult to retain the lubricant inside the ball screw nut 3.

SUMMARY OF THE INVENTION

An object of the present invention is to substantially eliminate defects or drawbacks encountered conventionally as mentioned above and to provide seal for a ball screw capable of effectively preventing foreign material from invading into a ball screw nut from an outside thereof and retaining lubricant therein.

Another object of the present invention is to provide a ball screw provided with such a seal mentioned above.

These and other objects can be achieved according to the present invention by providing, in one aspect, a seal for a ball screw including a ball screw shaft, a ball screw nut and a number of balls accommodated between the ball screw shaft and the ball screw nut, in which the ball screw shaft has an outer peripheral surface on which a ball rolling groove is formed and the ball screw nut has an inner peripheral surface on which a ball rolling groove corresponding to the ball rolling groove of the screw shaft is formed, the seal for the ball screw being disposed to each of both axial ends of the ball screw nut and comprising:

a foreign material removing member having a hole of a shape corresponding to a sectional shape of the ball screw shaft taken perpendicularly to an axis thereof to prevent a foreign material from invading from an outside of the ball screw nut to an inside thereof; and a seal member having a hole of a shape corresponding to a sectional shape of the ball screw shaft taken perpendicularly to an axis thereof to retain a lubricant existing inside the ball screw nut, the foreign material removing member and the seal member being mounted to the ball screw shaft while being overlapped to each other in a state that inner peripheral portions of the foreign material removing member and the seal member contact an outer peripheral surface of the ball screw shaft and the ball rolling groove thereof, the foreign material removing member being disposed outside the seal member in the axial direction of the ball screw nut.

According to this aspect, the foreign material removing member disposed outside contacts the outer peripheral surface and the ball rolling groove of the ball screw, so that the invasion or entrance of the foreign material from the outside of the nut of the ball screw can be effectively prevented. Furthermore, the seal member disposed inside the above-mentioned foreign material removing member contacts the outer peripheral surface and the ball rolling groove of the screw shaft to thereby effectively retain the lubricant inside the nut. Therefore, according to the structure of the seal for the ball screw of the present invention, both the functions of preventing the invasion of the foreign material into the nut and retaining the lubricant inside the nut can be achieved together.

In preferred embodiments of this aspect, the seal member is formed from a soft material and the foreign material removing member is formed from a material harder than the material of the seal member. The seal member is formed from a material capable of absorbing a lubricant. The seal member may be formed of an on woven fabric. The foreign material removing member and the seal member may be formed from the same material but having different hardness.

The above-mentioned foreign material removing member and the seal member are formed in shape of thin plate and another foreign material removing member of the same character as that of the first mentioned one is disposed inside the seal member in the axial direction of the ball screw nut so as to sandwich the seal member between the foreign material removing members. The foreign material removing member and the seal member are formed by, for example, punching out thin plates.

The foreign material removing member and the seal member are provided with positioning portions so as to be overlapped to each other in a state of being shifted in circumferential directions thereof at a predetermined angle.

The foreign material removing member is provided, at an inner peripheral surface thereof, with protruded portion in form of spiral to be fitted to the ball rolling surface of the screw shaft and a foreign material removing opening formed from an end face of the foreign material removing member directed outward in the axial direction of the nut to a middle portion thereof for scraping and discharging the foreign material outside the nut.

According to these preferred embodiments, the foreign material removing member formed from a hard material can easily have a function of preventing foreign materials from invading from the outside of the ball screw nut to the inside thereof. On the other hand, the seal member formed from a soft material softly and closely contacts the outer peripheral surface and the ball rolling groove of the screw shaft, so that the sealing performance therebetween can be enhanced, thus improving the lubricant retaining function of the seal member.

In the embodiment in which the seal member is formed of a material capable of absorbing the lubricant, the lubricant adhering to the outer peripheral surface and the ball rolling groove of the screw shaft can be effectively absorbed, thus also improving the lubricant retaining performance inside the ball screw nut.

Moreover, in the experimental test, in which the seal member is formed from a nonwoven fabric, both the functions of preventing the invasion of the foreign material into the nut and retaining the lubricant inside the nut could be achieved together with good results.

According to the formation of the foreign material removing member and the seal member with thin plate materials and the location of the seal member between the two foreign material removing members in the sandwiched state, the seal member is not deformed and the seal can be easily assembled to the ball screw nut.

The sectional area of the ball screw shaft has a deformed circular shape. This deformed circular shape is the same along the axial direction of the screw shaft, but is out of phase in the circumferential direction. For this reason, it is necessary to consider such phase at the lamination time of the foreign material removing member and the seal member in the axial direction of the ball screw. According to the present invention, since the foreign material removing member and the seal member are provided with positioning portions so as to be overlapped to each other in a state shifted in circumferential directions thereof at a predetermined angle, the lamination or overlapped arrangement of these members can be easily done.

Furthermore, the foreign material removing member and the seal member are formed from thin plates, and accordingly, these members can be easily punched out even in plural numbers. Such punching-out method can reduce to a mold manufacturing cost to, for example, 1/10 in comparison with an injection molding process, with high production efficiency at cheap cost, thus being economical and convenient.

Still furthermore, the edge portion formed by the foreign material removing opening functions as a scraper for scraping the foreign material adhering to the outer peripheral surface and the ball rolling surface of the ball screw and then discharging outward it from the ball screw nut, so that the foreign material can be surely removed. Moreover, a fear of scraping the lubricant together can be eliminated by the seal member which can retain the lubricant inside the nut with minimum loss thereof.

In another aspect of the present invention, there is also provided a ball screw which comprises:

a ball screw shaft having an outer peripheral surface on which a ball rolling groove is formed;

a ball screw nut having an inner peripheral surface on which a ball rolling groove corresponding to the ball rolling groove of the screw shaft is formed;

a number of balls accommodated between the ball screw shaft and the ball screw nut and rolling therebetween; and seals mounted to both end portions of the ball screw nut in an axial direction thereof, each of these seals comprising:

a foreign material removing member having a hole of a shape corresponding to a sectional shape of the ball screw shaft taken perpendicularly to an axis thereof to prevent a foreign material from invading from an outside of the ball screw nut to an inside thereof; and a seal member having a hole of a shape corresponding to a sectional shape of the ball screw shaft taken perpendicularly to an axis thereof to retain a lubricant existing inside the ball screw nut, the foreign material removing member and the seal member being mounted to the ball screw shaft while being overlapped to each other in a state that inner peripheral portions of the foreign material removing member and the seal member contact an outer peripheral surface of the ball screw shaft and the ball rolling groove thereof, the foreign material removing member being disposed outside the seal member in the axial direction of the ball screw nut.

According to this aspect, substantially the same functions and effects as those mentioned above with reference to the seal for the ball screw will be achieved. Especially, according to the structure of the ball screw provided with the improved seal, both the functions of preventing the invasion of the foreign material into the ball screw nut and retaining the lubricant inside the nut can be effectively achieved.

The nature and further characteristic features of the present invention will be made more clear from the following descriptions with reference to the accompanying drawings.

DESCRIPTION OF THE PREFERRED EMBODIMENTS

Figure 1:
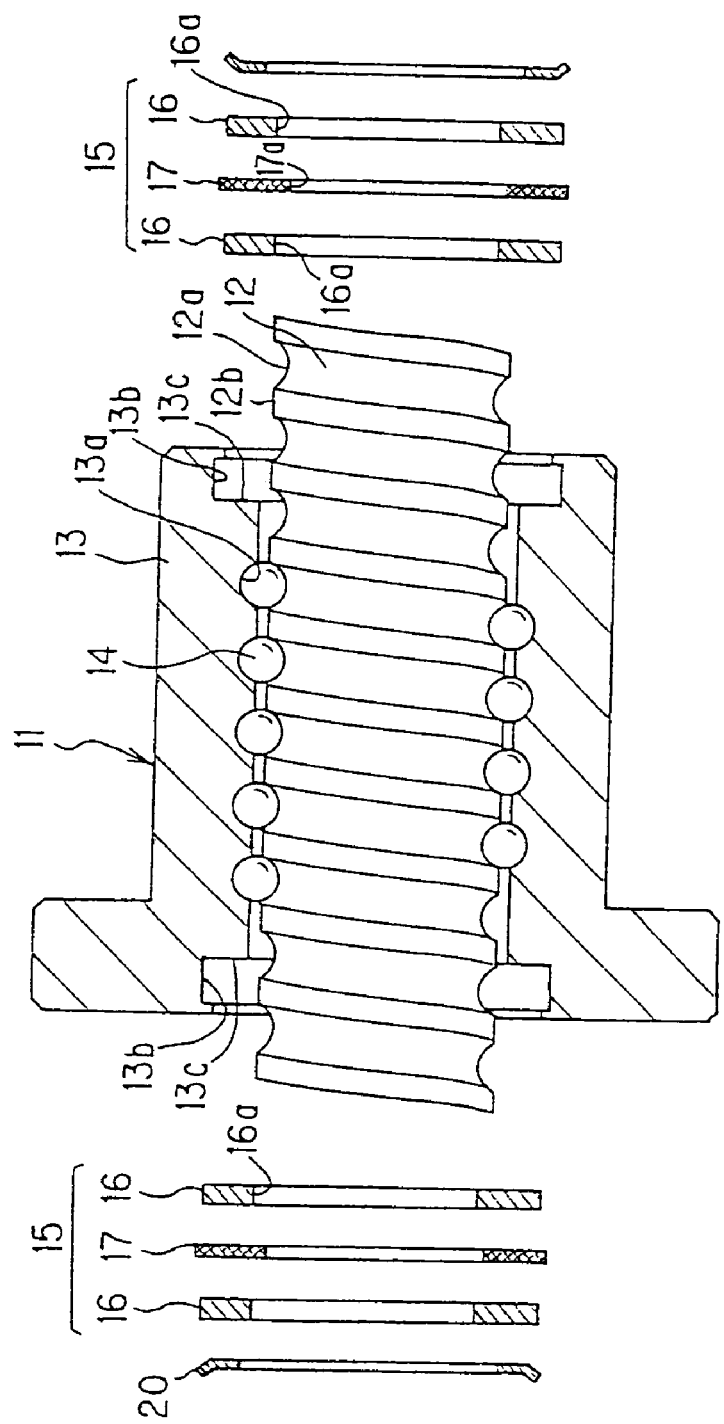
FIG. 1 is a developed sectional view of a ball screw provided with a seal according to a first embodiment of the present invention.
Figure 2:
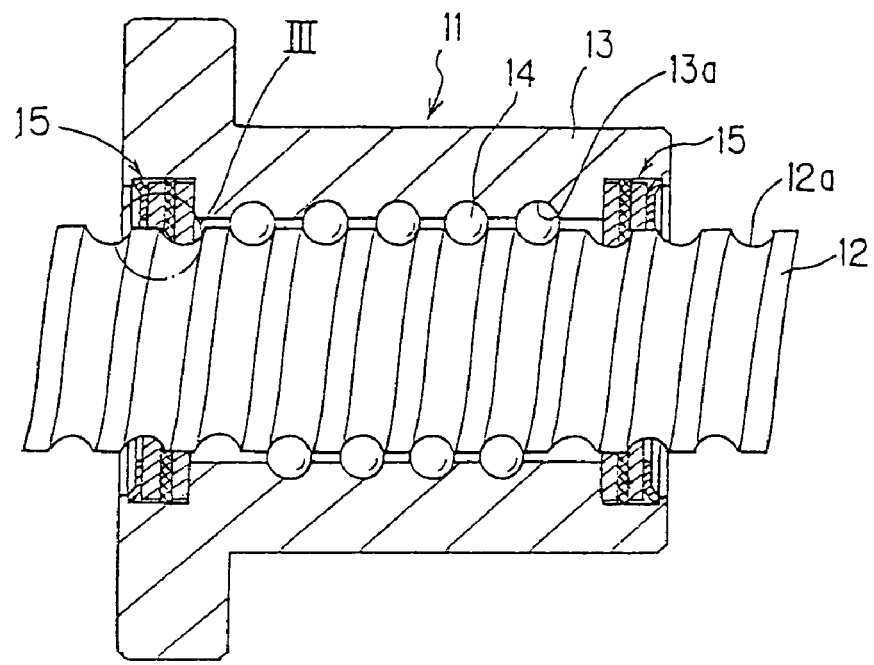
FIG. 2 is a sectional view of the ball screw in an assembled state thereof.

With reference to FIGS. 1 and 2 showing one embodiment of a ball screw provided with a seal according to the present invention, a ball screw 11 generally comprises a ball screw shaft 12, a ball screw nut 13 and a number of balls 14, 14, —accommodated between the ball screw shaft 12 and the ball screw nut 13.

The ball screw shaft 12 shaft (called herein merely "screw shaft") has an outer peripheral surface with top and bottom lands which define a ball rolling groove 12a of spiral structure, and the ball screw nut 13 (called herein merely "nut") has an inner peripheral surface on which a ball rolling groove 13a having a spiral structure corresponding to the spiral ball rolling groove 12a of the screw shaft 12 is formed. The balls 14, 14, —are arranged between these ball rolling grooves 12a and 13a so as to roll therebetween.

When the screw shaft 12 is rotated, the balls 14, 14, —roll between the ball rolling groove 12a of the screw shaft 12 and the ball rolling groove 13a of the nut 13. The ball 14 arriving at one end of the ball rolling groove 13a returns to another one end of the ball rolling groove 12a via a return tube, not shown, secured to the nut 13.

In this first embodiment, the nut 13 has axial both end portions on which a pair of seal mounting hole 13b, 13b are formed. A seal 15 in shape of ring is fitted to each of these seal mounting holes 13b and pressed against a wall surface 13c of the hole 13b by means of locating snap ring or merely snap ring 20.

The seal 15 for the ball screw 11 comprises a seal member 17 in shape of thin plate and a pair of foreign material removing members 16, 16, each in shape of thin plate, between which the seal member 17 is sandwiched. These members 16 and 17 are all formed with central holes 16a and 17a corresponding to the cross sectional shape of the ball screw shaft 12 taken perpendicularly to the axial direction thereof.

The shapes of the inner peripheries of the foreign material removing members 16, 16 and the seal member 17 closely resemble the sectional shape of the screw shaft 12 taken perpendicularly to the axial direction thereof and has a minute interference with respect to the sectional shape of the screw shaft 12 taken perpendicularly to the axial direction thereof. The inner peripheries of the foreign material removing members 16, 16 and the seal member 17 contact the ball rolling groove 12a of the screw shaft 12 and the outer periphery 12b thereof, respectively.

The seal member 17 has a thin plate structure having a thickness of about 1 mm and manufactured by punching a sheet plate member by a press (so-called shearing working). This seal member 17 may be formed, so as to absorb lubricant, from a nonwoven fabric such as wool felt, a porous material such as sintered polyethylene having a high porosity. The seal member 17 is also formed from a material softer than that forming the foreign material removing member 16. As a material for the seal member 17, it is desired to use a material having improved anti-wearing property, anti-chemical property and heat resisting property.

On the other hand, the foreign material removing member 16 is also formed from a thin plate having a thickness of about 1 mm and manufactured by punching a sheet plate member by a press (so-called shearing working). This foreign material removing member 16 is formed from a material (substance) of synthetic resin or hard rubber such as PTFE (Teflon+ Graphite), UPE (ultra high polymer polyethylene), PA (polyamide resin) or like. The foreign material removing member 16 is also formed from a material harder than that of the seal member 17. As such foreign material removing member 16, it is desired to use a material having a good sliding performance, anti-wearing property, anti-chemical property and heat-resisting property.

Figure 3:
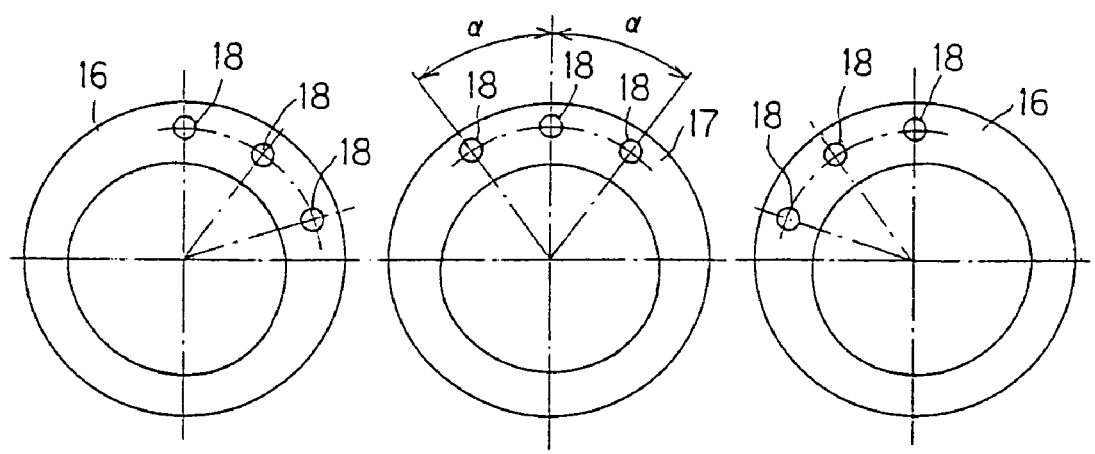
FIG. 3 includes illustrated plan views showing foreign material removing member and seal member.
Figure 4:
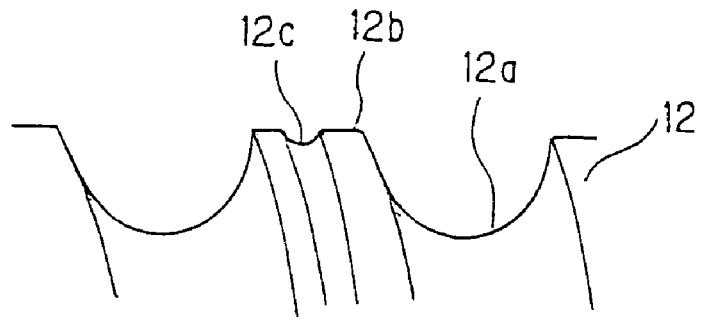
FIG. 4 is a partial side view showing a rolled thread.

FIG. 3 shows the foreign material removing members 16, 16 and the seal member 17 viewed, as plan views, from the direction of the axis thereof. These three members have the same plan shape. These members also have circular outer peripheries and inner peripheries having deformed circular shapes in conformity with the sectional shape of the screw shaft taken perpendicularly to the axis thereof.

Furthermore, holes 18, 18, —as positioning sections 18, 18, —, are formed to portions between the inner and outer peripheries of the foreign material removing members 16, 16 and the seal member 17 at predetermined angle in the same circumference thereof. An angle $\alpha$ between adjacent two holes is determined from a lead of the screw shaft 12 and thicknesses of the foreign material removing members 16, 16 and the seal member 17. Specifically, in the case of single thread screw of the screw shaft 12, the angle a between the adjacent two positioning sections (holes) 18, 18 is obtained from $\alpha$=(plate thickness/lead)×360°, and for example, In the case where lead is 10 mm and the thickness of the seal is 1 mm, the angle $\alpha$ is 36°.

Supposing this case of the angle $\alpha$ of 36°, the seal member 17 is overlapped to the outside foreign material removing member 16 with a state being rotated by 36° thereto and the inside foreign material removing member 16 is overlapped to the seal member 17 with a state being rotated by 36° with respect to the seal member 17.

Further, the holes 18, 18, —may be substituted with cutouts.

The sectional shape of the screw shaft 12 (perpendicular to the axis thereof) has a deformed circle (not true circle). The deformed circular shape provides the same shape even if its position in the axial direction of the screw shaft 12 is different, but the phase is shifted in the circumferential direction thereof. For this reason, it is necessary to consider the phase of the screw shaft 12 at the lamination (overlapping) time of the foreign material removing members 16, 16 to the seal member 17. In the illustrated embodiment, the positioning sections 18, 18, —are formed with the state that the foreign material removing members 16, 16 and the seal member 17 are shifted from each other in the circumferential direction thereof, so that the lamination thereof in consideration of the phase can be easily done.

Furthermore, the structure that the foreign material removing members 16, 16 and the seal member 17 are formed from thin plate members and then laminated makes it possible to contact the inner peripheries of these members 16 and 17 to the outer peripheral surfaces 12b of the screw shaft 12 and the ball rolling groove 12 even if these foreign material removing members 16, 16 and the seal member 17 are formed by mere a punch-out working. Particularly, in the case where the screw shaft 12 is formed through rolling process, a seaming 12c in form of groove is formed to the outer peripheral surface 12b of the screw shaft 12. According to the structure of the present embodiment, however, in such case, the inner peripheries of the foreign material removing members 16, 16 and the seal member 17 can be closely contacted to the seaming 12c.

Figure 5:
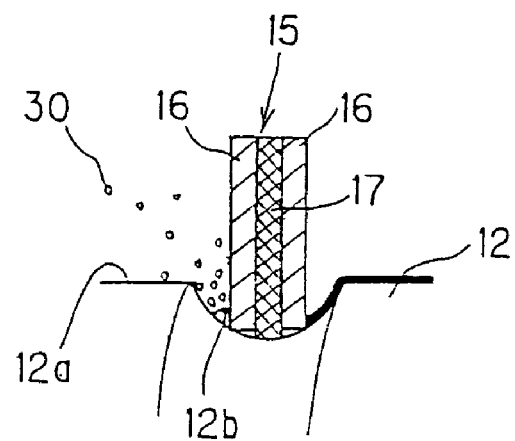
FIG. 5 shows a portion III in FIG. 2 in an enlarged scale for showing a foreign material removing state and a lubricant retaining state.

FIG. 5 illustrates a state that the foreign material (or substance) is being removed and the lubricant has been retained. With reference to FIG. 5, the foreign material removing member 16 disposed most outside (left side as viewed) contacts the outer peripheral surface 12b and the ball rolling groove 12a of the ball screw 12, so that the invasion or entrance of the foreign material from the outside of the nut of the ball screw can be effectively prevented. Furthermore, the seal member 17 disposed inside the above-mentioned foreign material removing member 16 softly and closely contacts the outer peripheral surface 12b and the ball rolling groove 12a of the screw shaft 12 and absorbs the lubricant, so that the leakage of the lubricant from the inside of the nut to the outside thereof can be also prevented. Therefore, according to the structure of the seal 15 for the ball screw of the present invention mentioned above, both the functions of preventing the invasion of the foreign material 30 into the nut and retaining the lubricant inside the nut can be achieved together, thus enabling long term maintenance-free characteristic to be achieved.

Figure 6:
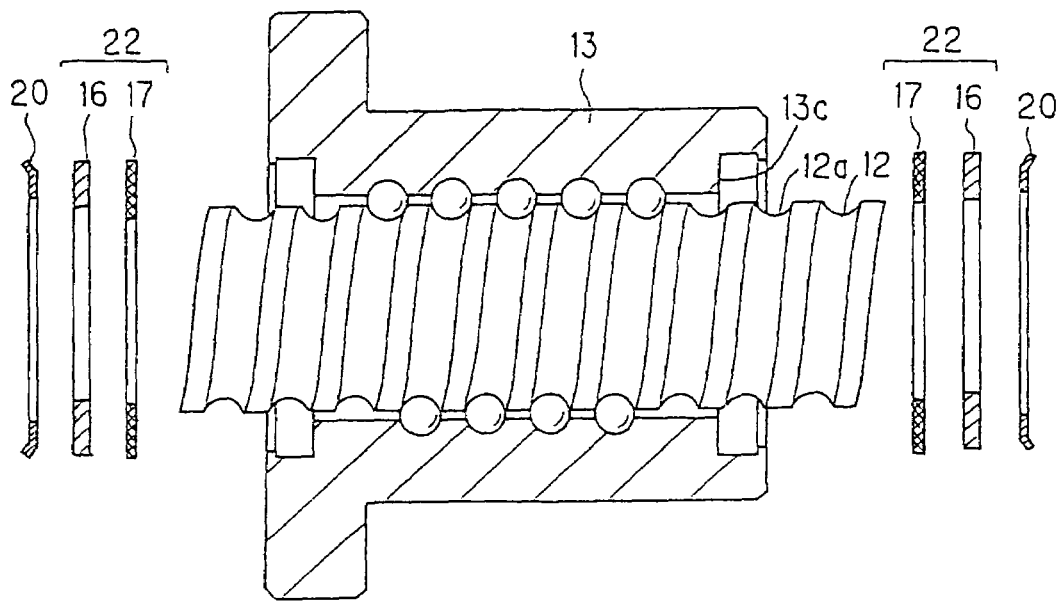
FIG. 6 is a developed sectional view of a ball screw provided with a seal according to a second embodiment of the present invention.
Figure 7:
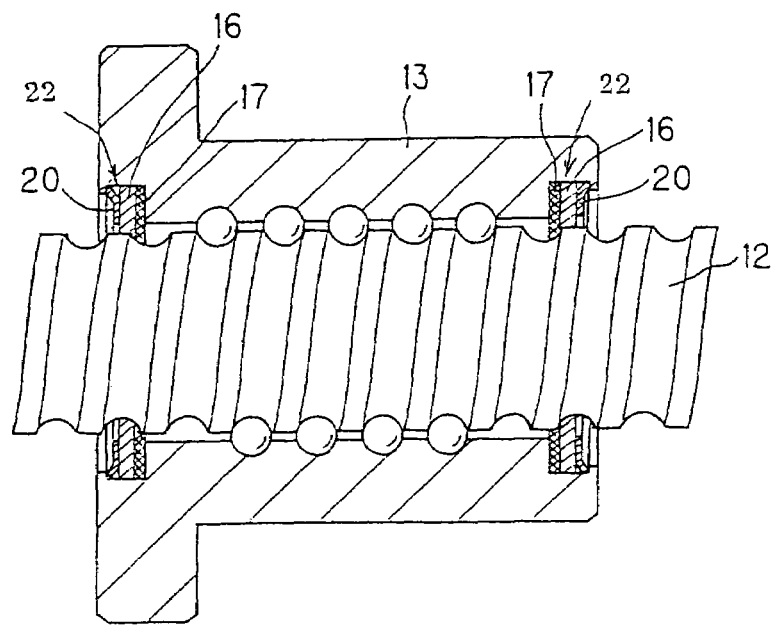
FIG. 7 is a sectional view of the ball screw in an assembled state of the ball screw of FIG. 6.

FIGS. 6 and 7 represent the second embodiment of the seal for the ball screw according to the present invention.

With reference to FIGS. 6 and 7, a seal 22 for the ball screw comprises a foreign material removing member 16 disposed most outside the nut 13 in its axial direction and a seal member 17 disposed inside this foreign material removing member 16, both members being overlapped in this axial direction in the assembled state at each of the axial end portions of the nut 13.

The seals 22 for the ball screw are fitted to seal mounting holes 13b, 13b formed to both the axial end portions of the nut 13 and pressed against wall surfaces 13c, 13c of the seal mount holes 13b, 13b respectively by means of locating snap rings 20.

In this second embodiment, the seal member 17 formed of a soft material is disposed between the wall surface 13c formed to the seal mounting hole 13b of the nut 13 and the foreign material removing member 16, so that the seal member 17 can be prevented from being deformed. Further, in this second embodiment, the basic structures of the foreign material removing members 16, 16, the seal member 17, the screw shaft 12 and the nut 13 are substantially the same as those of the first embodiment, and accordingly, the details thereof are omitted herein by adding the same reference numerals.

In the seal 22 for the ball screw of this second embodiment, the foreign material removing a member 16 disposed outside contacts the outer peripheral surface 12b and the ball rolling groove 12a of the ball screw 12, so that the invasion or entrance of the foreign material from the outside of the nut of the ball screw can be effectively prevented. Furthermore, the seal member 17 disposed inside the above-mentioned foreign material removing member 16 softly and closely contacts the outer peripheral surface 12b and the ball rolling groove 12a of the screw shaft 12 and absorbs the lubricant, so that the leakage of the lubricant from the inside of the nut to the outside thereof can be also prevented. Therefore, according to the structure of the seal 15 for the ball screw of the present invention mentioned above, both the functions of preventing the invasion of the foreign material 30 into the nut and retaining the lubricant inside the nut can be satisfied together.

In the first and second embodiments mentioned above, the seal member 17 is formed of a material softer than that of the foreign material removing member 16 and the seal member 17 can absorb the lubricant. In a modified example, it is not always necessary for the seal member 17 formed from a material softer than that of the foreign material removing member 16 that the seal member 17 is formed from a material capable of absorbing the lubricant, and in such example, the seal member 17 may be formed from a non-porous synthetic resin or rubber material.

On the contrary, in a case where the seal member 17 is formed from a material capable of absorbing the lubricant, it may be possible to form the seal member 17 from a material harder than that of the foreign material removing member 16.

Figure 8:
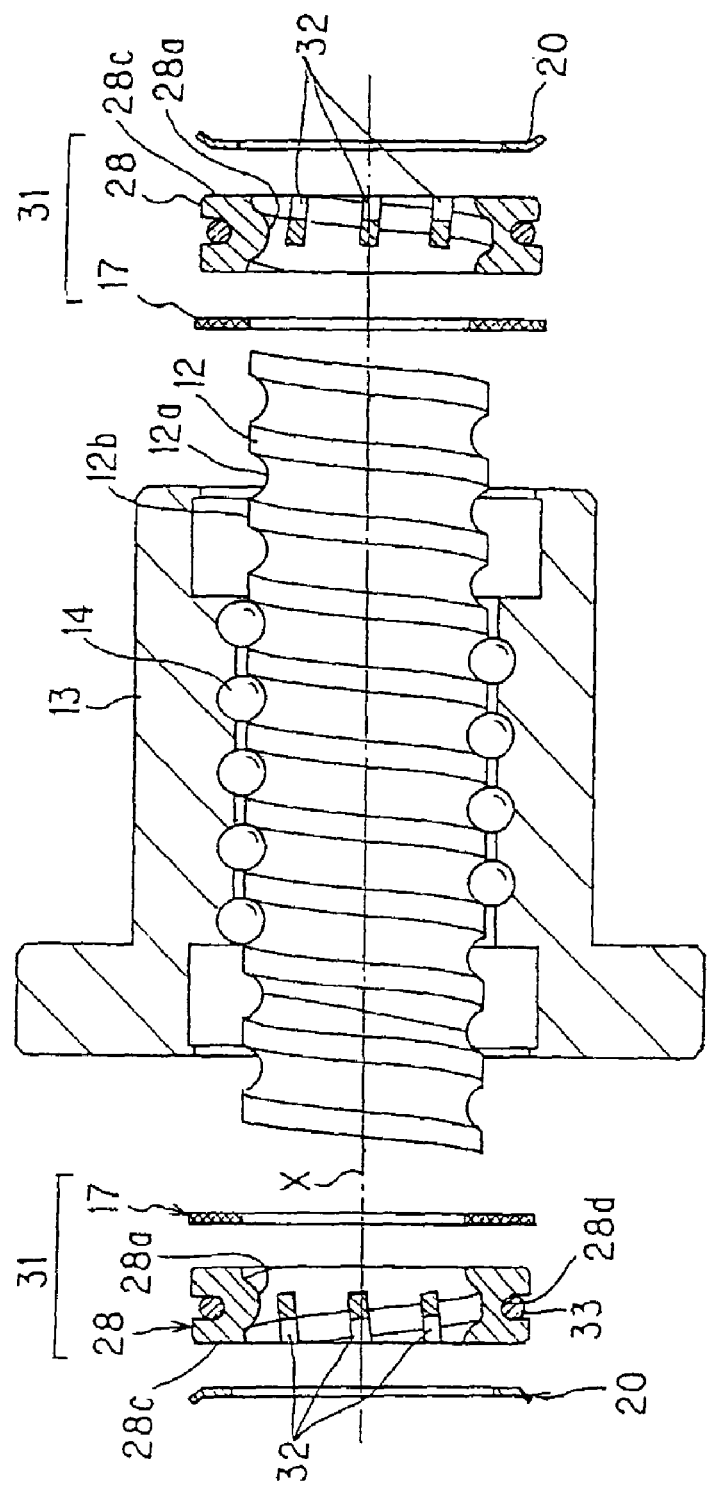
FIG. 8 is a developed sectional view of a ball screw provided with a seal according to a third embodiment of the present invention.
Figure 9:
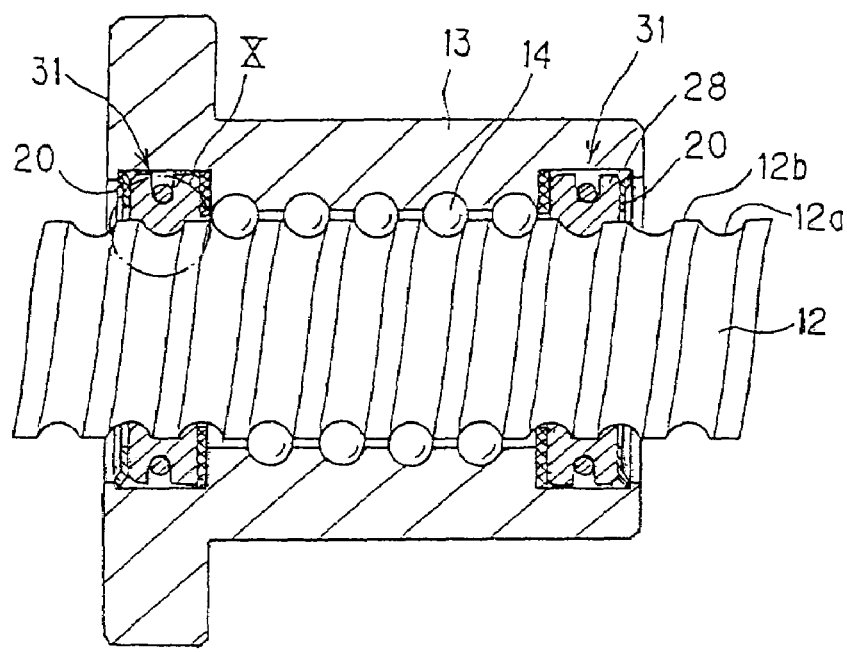
FIG. 9 is a sectional view of the ball screw in an assembled state of the ball screw of FIG. 8.

FIGS. 8 and 9 represent the third embodiment of the seal for the ball screw according to the present invention.

With reference to FIGS. 8 and 9, a seal 31 for the ball screw comprises a foreign material removing member 28 disposed outside the nut 13 in its axial direction and a seal member 17 disposed inside this foreign material removing member 28, both members 28 and 17 being overlapped in this axial direction in the assembled state at each of the axial end portions of the nut 13.

In this third embodiment, the foreign material removing member 28, different from that of the former embodiments, have a large thickness and a projection (protruded portion) 28a is formed to an inner peripheral surface of the foreign material removing member 28 in shape of spiral so as to be fitted to the ball rolling groove 12b of the screw shaft 12. Such foreign material removing member 28 is manufactured from a synthetic resin through injection molding or cut working process.

Further, in this third embodiment, the basic structures of the seal member 17, the screw shaft 12 and the nut 13 are substantially the same as those of the first embodiment, and accordingly, the details thereof are omitted herein by adding the same reference numerals.

The foreign material removing member 28 of the seal 31 of the third embodiment is formed with a plurality of foreign material removing openings, in form of slits, 32, 32, —so as to extend from an end surface portion 28c facing axially outside of the nut 13 towards the midway of the foreign material removing member 28 in its axial direction. These foreign material removing slits 32, 32, —act to scrape foreign materials 30 adhering to the surface of the screw shaft 12 and discharge them externally of the nut 13.

The foreign material removing slits 32, 32, —extend approximately in the radial direction of the screw shaft 12 and opened so as to penetrate from the inner periphery to the outer periphery of the foreign material removing member 28. The foreign material removing slits 32, 32, —are formed at equal intervals from each other in the circumferential direction of the foreign material removing member 28. One of opposing surfaces of the foreign material removing member 28 forming the foreign material removing slits 32, 32, —functions as a scraper surface having an edge portion for removing the foreign materials, and furthermore, these slits 32, 32, are formed so as to incline with respect to the lead of the screw shaft 12 to displace the lubricant scraped by the scraper surface outside the nut 13.

Still furthermore, a groove 28d is formed to the outer periphery of the foreign material removing member 28 so as to extend in the circumferential direction thereof, and a spring or like elastic member 33 is wound around this groove 28d. The arrangement of such spring member 33 around the groove 28d enhances the tight contact of the foreign material removing member 28 and hence improves the sealing performance thereof. In addition, it becomes possible to surely tightly contact the edge portion of the foreign material scraping surface to the screw shaft 12 and hence to surely scrape the foreign materials.

Figure 10:
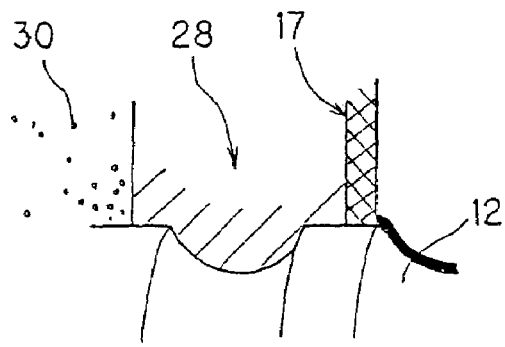
FIG. 10 shows a portion X in FIG. 9 in an enlarged scale for showing a foreign material removing state and a lubricant retaining state.

FIG. 10 shows a state of the removal of the foreign materials and the retaining of the lubricant by the seal 31 of the third embodiment of the present invention. In this embodiment, like the other embodiments, since the foreign material removing member 28 contacts the ball rolling groove 12a of the screw shaft 12, the invasion of the foreign materials 30 inside the nut 13 can be prevented. Moreover, since the edge portion formed by the foreign material removing slit functions as a scraper to thereby scrape the foreign materials adhering to the outer peripheral surface 12b of the ball rolling groove 12a and then discharge externally of the nut 13, the foreign materials can be surely removed and discharged.

Still furthermore, since the seal member 17 arranged inside the foreign material removing member 28 softly contacts the surface of the outer peripheral surface 12b of the screw shaft 12 and the ball rolling groove 12a formed thereto and absorbs the lubricant adhering thereto, the flow-out of the lubricant from the inside of the nut to the outside thereof can be effectively prevented. Further, although there is a fear of scraping the lubricant inside the nut by the edge portion formed to the foreign material removing opening, according to the present invention, since the lubricant existing inside the nut can be retained therein by the seal member 17, only the less amount of the lubricant is scraped.

The foreign material removing member 28 has the spiral projection 28a which preferentially contacts the ball rolling groove 12a of the screw shaft 12 to thereby improve the foreign material removing performance. For this reason, the sealing performance to the outer peripheral surface 12b of the screw shaft 12 is made weak in comparison with that to the ball rolling groove 12a. In this third embodiment, the seal member 17 is disposed inside the foreign material removing member 28 so as to contact the outer peripheral surface 12b of the screw shaft 12 and the ball rolling groove 12a thereof, the sealing performance can be further enhanced and the lubricant can be surely retained.

Further, it is to be noted that the present invention is not limited to the described embodiments and many other changes and modifications may be made.

For example, the seal of the present invention may be applicable, other than the ball screw as mentioned herein, to a ball spline guide, linear guide or like which comprises a track formed with a rolling member rolling passage and a movable member disposed to be movable through rolling members arranged between the movable member and the track. In such example, the movable member will be formed with a loaded rolling member rolling passage corresponding to the rolling member rolling passage of the track, a rolling member escape passage disposed to be parallel to the loaded rolling member rolling massage with a predetermined space and a pair of rolling direction changing members connecting the loaded rolling member rolling passage and the escape passage at both ends thereof so as to establish the circulation of the rolling member. In a case of the application to the linear guide device, seal member mounting holes are formed to both end portions of the movable member in its moving direction, and a seal provided with the foreign material removing member and the seal member, which are laminated, is mounted to such seal member mounting hole.

Performance tests of the embodiments of the present invention were carried out and the following test results were obtained as Example.

EXAMPLE

Figure 11:
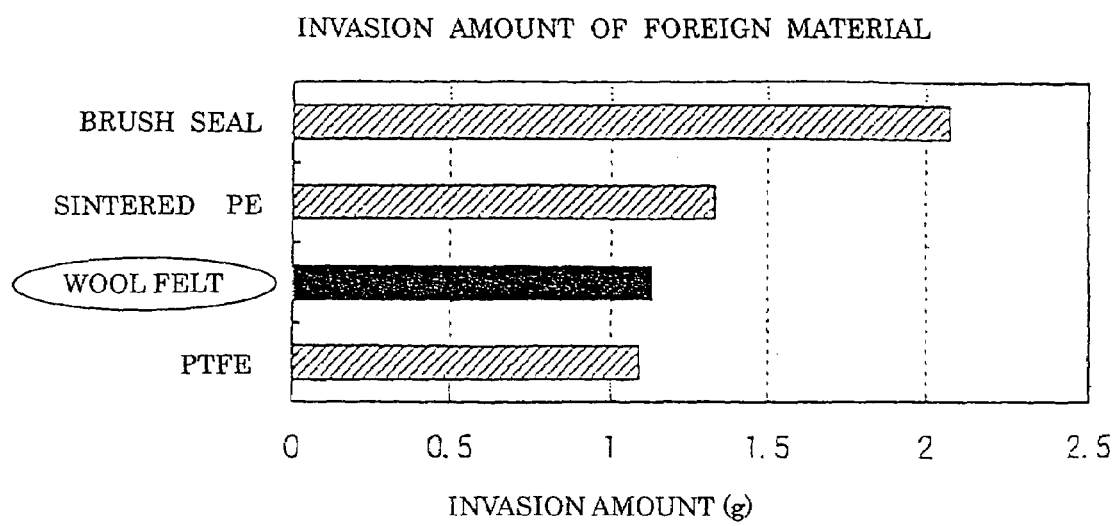
FIG. 11 is a graph representing a test result of foreign material removing performance test carried out by using a seal for the ball screw of the present invention (i.e. showing an invading amount of cast powder as foreign material)
Figure 12:
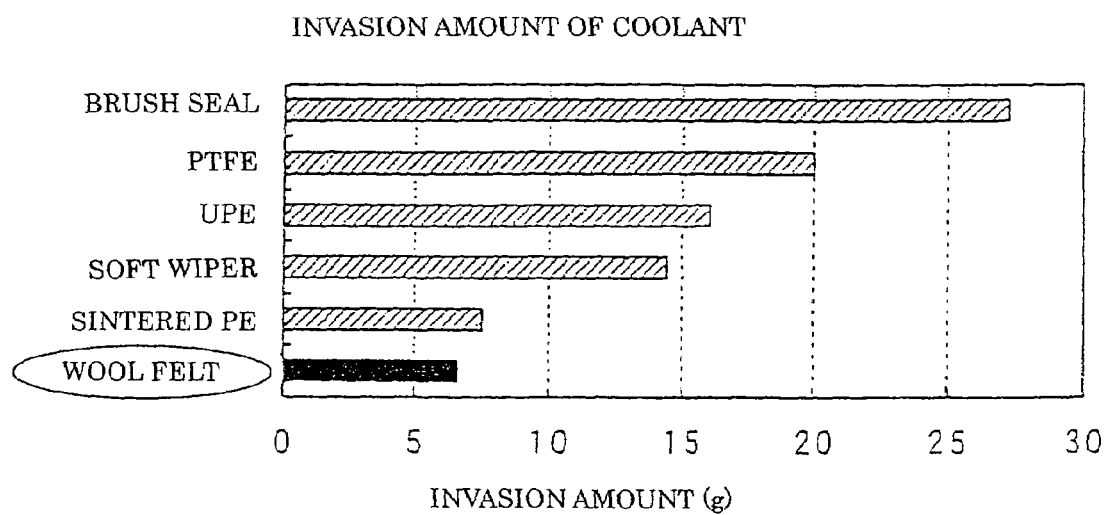
FIG. 12 is a graph representing a test result of foreign material removing performance test carried out by using a seal for the ball screw of the present invention (i.e. showing an invading amount of coolant as foreign material)

FIG. 11 is a graph representing a test result of foreign material removing performance to a seal for the ball screw of the present invention (i.e. showing an invading amount of cast powder as foreign material), and FIG. 12 is a graph representing a test result of foreign material removing performance to a seal for the ball screw of the present invention (i.e. showing an invading amount of coolant as foreign material).

In the experiment tests, there was utilized a seal for ball screw of the first embodiment in which the seal member 17 of thin plate structure is sandwiched by the foreign material removing members 16, 16 of thin plate structures disposed at both sides of the seal member 17. The foreign material removing members 16, 16 were formed of PTFE and the seal member 17 was formed of various materials described in the graph of FIGS. 11 and 12.

With reference to the graphs of FIGS. 11 and 12, a brush seal is a known seal member formed by embedding a number of synthetic resin to an inner peripheral surface of a ring, and such brush seal is not assembled with any foreign material removing member. In these figures, the sintered PE, the PTFE and the UPE represent, respectively, a sintered polyethylene, a material of (Teflon+graphite), and an ultra-high polymer polyethylene. The soft wiper shown in the figure means a material formed by solidifying polyester fiber with urethane rubber having lubricant absorbing property.

In the test of FIG. 11, cast powder was sprinkled to the ball screw nut at a rate of 120 g/24 h. The invasion amount of axis of abscissa represents an invasion amount of the case powder inside the nut under a condition that a ball screw nut is traveled by 50 km.

In the test of FIG. 12, coolant was sprinkled to the ball screw nut at a rate of 0.6 cc/min. The invasion amount of the axis of abscissa represents an invasion amount of the coolant inside the nut under a condition that a ball screw nut is traveled by 0.5 km.

As shown in FIGS. 11 and 12, in a case where wool felt was utilized as a material of the seal member 17, the invasion amount of the cast powder was reduced as well as coolant amount. On the contrary, in a case where the seal member was formed of the PTFE as like as the foreign material removing members 16, the invasion amount of the cast powder could be reduced, but it was found to be difficult to reduce the invasion amount of the coolant.

Figure 13:
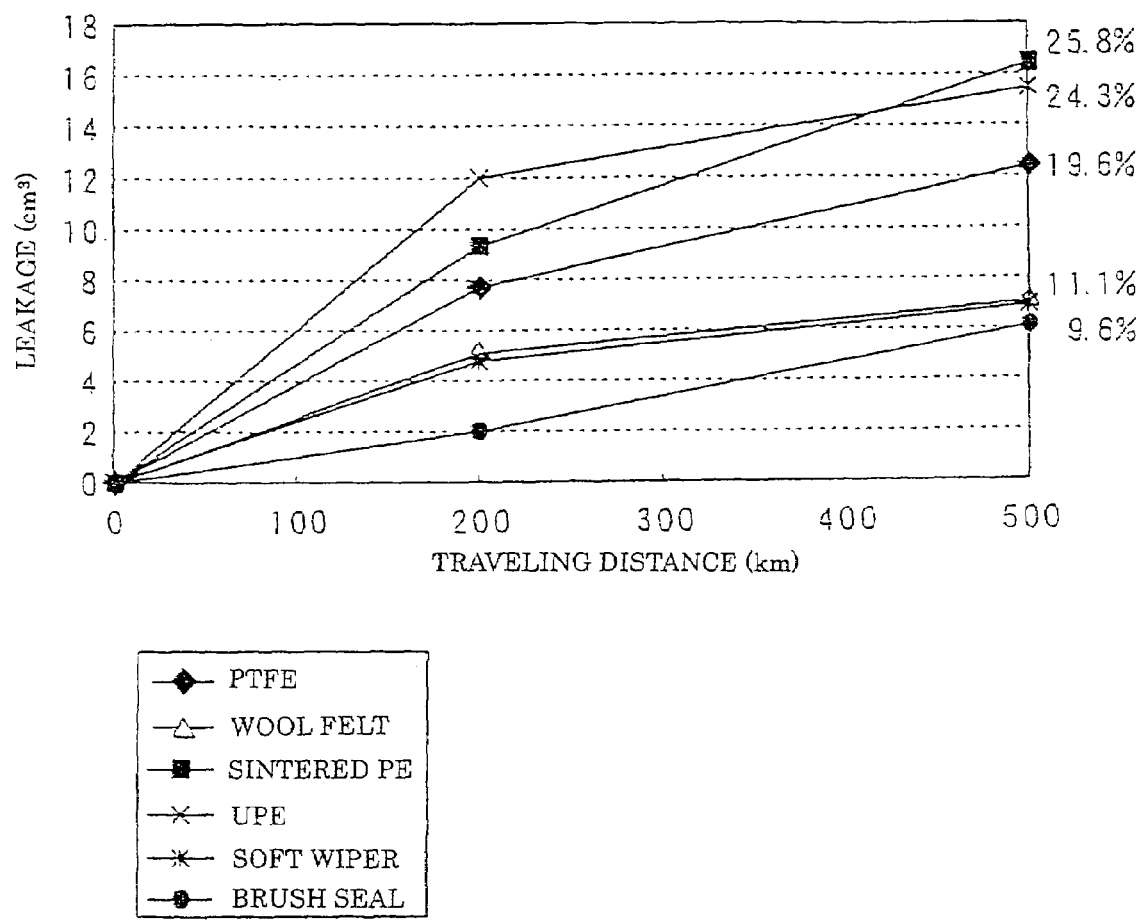
FIG. 13 is a graph representing a test result of lubricant sealing performance test carried out by using a seal for the ball screw according to the present invention.
Figure 14:
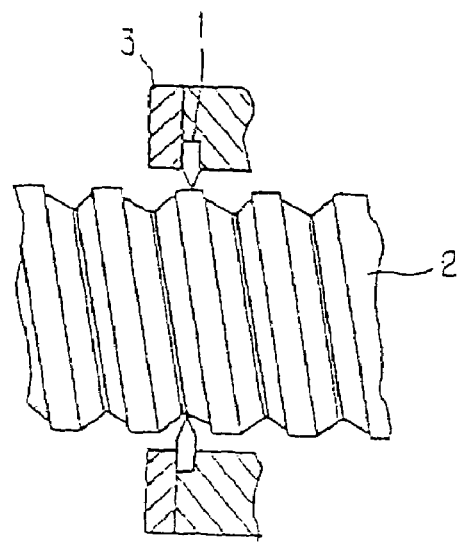
FIG. 14 shows a sectional view of a portion of one example of a seal for a ball screw having a conventional structure.
Figure 15:
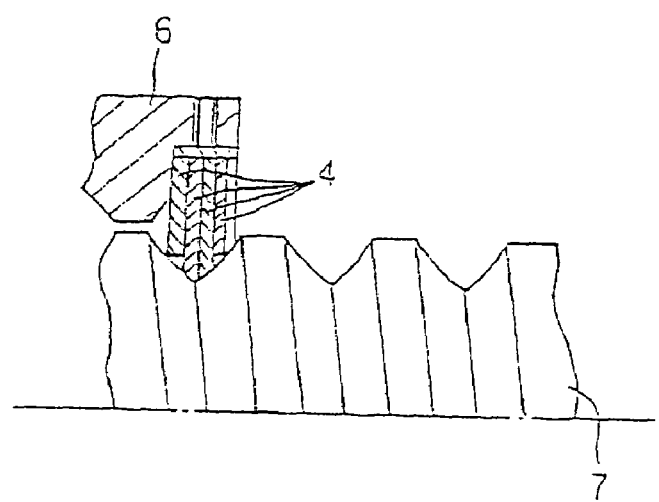
FIG. 15 shows a sectional view of a portion of another example of a seal for a ball screw having a conventional structure.

FIG. 13 is a graph representing a test result of lubricant sealing performance of the seal for the ball screw according to the present invention.

In this test, as like as in the experimental tests mentioned above, there was utilized a seal for ball screw of the first embodiment in which the seal member 17 of thin plate structure is sandwiched by the foreign material removing members 16, 16 of thin plate structures disposed at both sides of the seal member 17. The foreign material removing members 16, 16 were formed of PTFE and the seal member 17 was formed of various materials shown in the graph of FIG. 13.

With reference to FIG. 13, the brush seal, the sintered PE, the PTFE, the UPE and the soft wiper were formed from the same materials as those utilized in the tests of FIGS. 11 and 12. The axis of abscissa shows a traveling distance (km) and an axis of ordinate shows a leakage amount of the lubricant from the inside to the outside of the ball screw nut.

As can be seen from FIG. 13, it will be found that, in the case where wool felt or soft wiper, which is a material softer than that of the foreign material removing member 16, was utilized, the leakage of the lubricant can be reduced, and that in the case where the seal member 17 formed of the same material as the PTFE material of the foreign material removing member 16 was utilized, it was difficult to effectively reduce the leakage of the lubricant.

The present application claims priority under 35 U.S.C § 119 to Japanese Patent Application No. 2001-106801 filed Apr. 5, 2001 entitled "SEAL FOR BALL SCREW AND BALL SCREW UTILIZING SAME", and No. 2002-62602 filed Mar. 7, 2002 entitled "SEAL FOR BALL SCREW AND BALL SCREW UTILIZING SAME". The contents of that application are incorporated herein by reference in their entirety.

What is claimed is:

1. A seal for a ball screw including a ball screw shaft, a ball screw nut and a number of balls accommodated between the ball screw shaft and the ball screw nut, in which the ball screw shaft has an outer peripheral surface on which a ball rolling groove is formed and the ball screw nut has an inner peripheral surface on which a ball rolling groove corresponding to the ball rolling groove of the screw shaft is formed, said seal for the ball screw being disposed at each of both end portions of the ball screw nut and comprising:

a foreign material removing member formed in a shape of a thin plate and having a hole of a shape corresponding to a sectional shape of the ball screw shaft taken perpendicularly to an axis thereof to prevent foreign material from invading from an outside of the ball screw nut to an inside thereof, a seal member formed in a shape of a thin plate and having a hole of a shape corresponding to a sectional shape of the ball screw shaft taken perpendicularly to an axis thereof to retain lubricant existing inside the ball screw nut, said seal member being formed from a lubricant absorbing material; and said foreign material removing member and said seal member being mounted to the ball screw shaft while being overlapped to each other in a state that inner peripheral portions of the foreign material removing member and the seal member contact an outer peripheral surface of the ball screw shaft and the ball rolling groove thereof, said foreign material removing member being disposed outside the seal member in the axial direction of the ball screw nut, wherein said seal member is formed from soft material and said foreign material removing member is formed from a material harder than the material of the seal member.

2. A seal for a ball screw according to claim 1, wherein the seal member is formed as a ring from the thin plate.

3. A seal for a ball screw according to claim 1, wherein said seal member is formed of a nonwoven fabric.

4. A seal for a ball screw according to claim 1, wherein said foreign material removing member and said seal member is formed by punching out from the thin plates.

5. A seal for a ball screw according to claim 1, wherein the seal member is formed of a soft material disposed between the wall surface formed to the seal mounting hole of the nut and the foreign material removing member.

6. A ball screw comprising:

a ball screw shaft having an outer peripheral surface on which a ball rolling groove is formed;

a ball screw nut having an inner peripheral surface on which a ball rolling groove corresponding to the ball rolling groove of the screw shaft is formed;

a number of balls accommodated between the ball screw shaft and the ball screw nut and rolling therebetween; and seals mounted to both end portions of the ball screw nut in an axial direction thereof, each of said seals comprising:

a foreign material removing member formed in a shape of a thin plate and having a hole of a shape corresponding to a sectional shape of the ball screw shaft taken perpendicularly to an axis thereof to prevent foreign material from invading from an outside of the ball screw nut to an inside thereof;

a seal member formed in a shape of a thin plate and having a hole of a shape corresponding to a sectional shape of the ball screw shaft taken perpendicularly to an axis thereof to retain lubricant existing inside the ball screw nut, said seal member being formed from a lubricant absorbing material; and said foreign material removing member and said seal member being mounted to the ball screw shaft while being overlapped to each other in a state that inner peripheral portions of the foreign material removing member and the seal member contact an outer peripheral surface of the ball screw shaft and the ball rolling groove thereof, said foreign material removing member being disposed outside the seal member in the axial direction of the ball screw nut, wherein said seal member is formed from soft material and first and second foreign material removing member is formed from a material harder than the material of the seal member.

7. A ball screw according to claim 6 wherein the seal member is formed as a ring from the thin plate.

8. A ball screw according to claim 6 wherein said seal member is formed of a nonwoven fabric.

9. The ball screw according to claim 6, wherein said foreign material removing member and said seal member is formed by punching out from the thin plates.

10. A ball screw according to claim 6, wherein the seal member is formed of a soft material disposed between the wall surface formed to the seal mounting hole of the nut and the foreign material removing member.

11. A seal for a ball screw including a ball screw shaft, a ball screw nut and a number of balls accommodated between the ball screw shaft and the ball screw nut, in which the ball screw shaft has an outer peripheral surface on which a ball rolling groove is formed and the ball screw nut has an inner peripheral surface on which a ball rolling groove corresponding to the ball rolling groove of the screw shaft is formed, said seal for the ball screw being disposed at each of both end portions of the ball screw nut and comprising:

a first foreign material removing member formed in a shape of a thin plate and having a hole of a shape corresponding to a sectional shape of the ball screw shaft taken perpendicularly to an axis thereof to prevent foreign material from invading from an outside of the ball screw nut to an inside thereof;

a seal member formed in a shape of a thin plate and having a hole of a shape corresponding to a sectional shape of the ball screw shaft taken perpendicularly to an axis thereof to retain lubricant existing inside the ball screw nut, said seal member being formed from a lubricant absorbing material, said first foreign material removing member and said seal member being mounted to the ball screw shaft while being overlapped to each other in a state that inner peripheral portions of the first foreign material removing member and the seal member contact an outer peripheral surface of the ball screw shaft and the ball rolling groove thereof, said first foreign material removing member being disposed outside the seal member in the axial direction of the ball screw nut; and a second foreign material removing member formed in a shape of thin plate and having a hole of a shape corresponding to a sectional shape of the ball screw shaft taken perpendicularly to an axis thereof and disposed inside the seal member in the axial direction of the ball screw nut so as to sandwich the seal member between the first foreign material removing member and the second foreign material removing member.

12. A seal for a ball screw according to claim 11, wherein the seal member is formed of a soft material disposed between the wall surface formed to the seal mounting hole of the nut and the first and second foreign material removing members.

13. The ball screw comprising:
a ball screw shaft having an outer peripheral surface on which a ball rolling groove is formed;
a ball screw nut having an inner peripheral surface on which a ball rolling groove corresponding to the ball rolling groove of the screw shaft is formed;
a number of balls accommodated between the ball screw shaft and the ball screw nut and rolling therebetween; and
seals mounted to both end portions of the ball screw nut in an axial direction thereof,
each of said seals comprising:
a first foreign material removing member formed in a shape of a thin plate and having a hole of a shape corresponding to a sectional shape of the ball screw shaft taken perpendicularly to an axis thereof to prevent foreign material from invading from an outside of the ball screw nut to an inside thereof;
a seal member formed in a shape of a thin plate and having a hole of a shape corresponding to a sectional shape of the ball screw shaft taken perpendicularly to an axis thereof to retain lubricant existing inside the ball screw nut, said seal member being formed from a lubricant absorbing material,
said first foreign material removing member and said seal member being mounted to the ball screw shaft while being overlapped to each other in a state that inner peripheral portions of the first foreign material removing member and the seal member contact an outer peripheral surface of the ball screw shaft and the ball rolling groove thereof, said first foreign material removing member being disposed outside the seal member in the axial direction of the ball screw nut; and
a second foreign material removing member formed in a shape of a thin plate and having a hole of a shape corresponding to a sectional shape of the ball screw shaft taken perpendicularly to an axis thereof and disposed inside the seal member in the axial direction of the ball screw nut so as to sandwich the seal member between the first foreign material removing member and the second foreign material removing member.

14. The ball screw according to claim 13, wherein the seal member is formed of a soft material disposed between the wall surface formed to the seal mounting hole of the nut and the first and second foreign material removing members.

* * * * *